United States Patent
Chen et al.

(10) Patent No.: US 8,175,538 B1
(45) Date of Patent: May 8, 2012

(54) CALIBRATING A WIRELESS COMMUNICATION DEVICE

(75) Inventors: Chin-Hung Chen, Tainan (TW); Ning Zhang, Saratoga, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 652 days.

(21) Appl. No.: 12/334,799

(22) Filed: Dec. 15, 2008

(51) Int. Cl.
*H04B 1/00* (2006.01)

(52) U.S. Cl. .......................................... 455/69; 455/424

(58) Field of Classification Search .................. 455/69, 455/424, 276.1, 75, 68, 414.1, 422.1, 67.11, 455/67.14, 562.1; 375/219, 227, 346, 267, 375/299; 370/252

See application file for complete search history.

(56) References Cited

U.S. PATENT DOCUMENTS

| | | | |
|---|---|---|---|
| 6,449,266 B1 | 9/2002 | Hottinen et al. | |
| 6,895,253 B1 | 5/2005 | Carloni et al. | |
| 6,917,820 B2 | 7/2005 | Gore et al. | |
| 7,239,893 B2 | 7/2007 | Yang | |
| 7,400,907 B2 | 7/2008 | Jin et al. | |
| 7,746,943 B2 | 6/2010 | Yamaura | |
| 7,747,250 B2 * | 6/2010 | Larsson et al. | 455/424 |
| 7,920,533 B2 | 4/2011 | Koo et al. | |
| 2003/0096618 A1 | 5/2003 | Palenius | |
| 2005/0002353 A1 | 1/2005 | Horneman | |
| 2005/0141545 A1 | 6/2005 | Fein et al. | |
| 2005/0287978 A1 | 12/2005 | Maltsev et al. | |
| 2006/0098580 A1 | 5/2006 | Li et al. | |
| 2006/0252386 A1 | 11/2006 | Boer et al. | |
| 2007/0195974 A1 | 8/2007 | Li et al. | |
| 2007/0286303 A1 | 12/2007 | Yamaura | |
| 2008/0247370 A1 | 10/2008 | Gu et al. | |
| 2009/0080560 A1 | 3/2009 | Na et al. | |
| 2009/0086690 A1 | 4/2009 | Gu et al. | |
| 2009/0196372 A1 | 8/2009 | Zhang et al. | |
| 2010/0172425 A1 | 7/2010 | Pare, Jr. et al. | |
| 2011/0150066 A1 | 6/2011 | Fujimoto | |

* cited by examiner

*Primary Examiner* — Joseph Lauture (74) *Attorney, Agent, or Firm* — Bever, Hoffman & Harms, LLP (57) ABSTRACT

In a multiple-input, multiple-output system, the frequency of transmitted signals can be partitioned into some number of frequency bins. During an exchange of sounding signals, a first station can monitor the quality of the signals to select a second station that is qualified to participate in a calibration procedure. The first station can generate a first set of channel characteristics for a particular frequency bin based on the sounding signal it receives from the second station. The first station also receives channel state information from the second station which can be used to generate a second set of channel characteristics for the particular frequency bin. Then, the selected subsets of the first and second sets can be manipulated in order to determine a set of correction values for that frequency bin as well as for other frequency bins.

36 Claims, 3 Drawing Sheets

CALIBRATING A WIRELESS COMMUNICATION DEVICE

BACKGROUND

Multiple-input, multiple-output (MIMO) wireless communication systems use multiple antennas at both the transmitter and the receiver to improve performance. Each antenna at the transmitting station provides an individual path to each antenna at the receiving station.

Transmit beamforming (TxBF) can improve the range of a MIMO system and can also improve the data transmission rate. In a process referred to as beamforming, a TxBF-enabled device can utilize the knowledge of a MIMO channel to properly weight and combine the raw signals such that the reception in the receiving station is improved. By using beamforming, the received signals are, in effect, stronger and can therefore support higher data rates over longer distances.

A TxBF-enabled transmitting station (also referred to as a beamformer) relies on knowledge of the channel between it and a receiving station (also referred to as a beamformee) to help focus the transmissions to a specific location. A sounding signal from the beamformee can help the beamformer estimate channel characteristics such as the gain and phase response for each transmit and receive antenna pair between the beamformer and beamformee. If the channel is reciprocal, then the beamformer can use the training symbols it receives from the beamformee to make a channel estimate suitable for computing the transmit steering matrix.

However, differences in the gain and phase characteristics of the beamformer's transmit and receive chains can affect channel reciprocity. Hence, a calibration procedure is employed to calculate a correction matrix that can be applied at the beamformer to compensate for the differences between the transmit and receive chains. If both the beamformer and beamformee are calibrated, then reciprocity is restored in the baseband-to-baseband response in both the forward and reverse channels between the two stations.

The IEEE 802.11n wireless networking standard specifies that calibration of MIMO systems should be performed, but it does not specify how to perform the calibration. The calibration process can increase loads on the processing, power and memory resources of a TxBF-enabled transmitter. Improving the efficiency of the calibration process can help reduce those loads.

SUMMARY

Embodiments of the present invention pertain to methods of calibrating a wireless communication device (station), in particular a MIMO device having multiple antennas.

In one embodiment, the operating frequency of each transmitted signal is partitioned into a number of sub-carriers (frequency bins). In one such embodiment, during an exchange of sounding signals, a first station (the calibration initiator, e.g., the beamformer) can monitor the strength of the signals or certain quality metrics, such as pilot error vector magnitude (EVM) or cyclic redundancy check (CRC), it perceives. The first station can then use that information to select a second station that is qualified to participate in the calibration procedure. The beamformer can generate a first set of channel characteristic values (e.g., a channel matrix) for a particular frequency bin based on the sounding signal it receives from the second station (the calibration responder, e.g., the beamformee). The beamformer also receives channel state information (CSI) from the beamformee in response to the sounding signal that it sent to the beamformee, and can use the CSI to generate a second set of channel characteristic values (e.g., another channel matrix) for that particular frequency bin. Then, subsets of the first and second sets can be selected and manipulated in order to determine a set of correction values (e.g., a correction matrix) that can be applied to signals in the frequency bin. Different subsets of the first and second sets of channel characteristic values can be selected to determine other sets of correction values for the frequency bin—for example, the sets of correction values can be averaged to determine a better result for the frequency bin. Alternatively, the correction values for the first frequency bin can be used along with correction values for one or more other frequency bins to derive correction values for yet other frequency bins (e.g., for faded bins) using interpolation, for example.

In summary, the calibration initiator can select a qualified station to serve as the calibration responder. Either station can terminate the calibration procedure if the quality of the link between the two stations is not satisfactory. Accordingly, the reliability of the calibration process is improved.

In addition, better correction values can be calculated for each frequency bin, including correction values for faded bins, thereby improving the quality of the calibration results.

In general, correction values can be determined more efficiently, and as a result, the loads on processing, power and memory resources can be reduced.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 1:
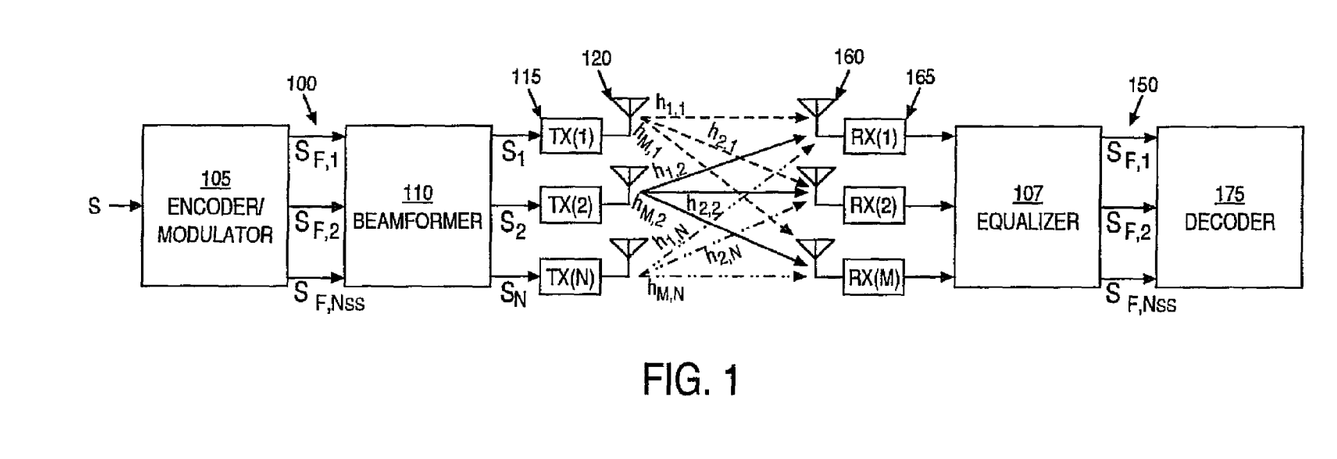
FIG. 1 is a block diagram showing wireless communication devices according to an embodiment of the invention.

FIG. 1 is a block diagram of one embodiment of a wireless communication device (station) 100. The device 100 may be referred to as a multiple-input, multiple-output (MIMO) device with a number N of antennas in an antenna array 120. Also shown is an embodiment of another MIMO device 150 having a number M of antennas in an antenna array 160. In the example of FIG. 1, M is equal to N.

A transmitting device may be generally referred to as a beamformer, and a receiving device may be generally referred to as a beamformee. A device may perform either or both roles, and thus may be referred to as a transmitter or beamformer when it is transmitting, and as a receiver or beamformee when it is receiving.

In FIG. 1, a single block may be described as performing a function or functions; however, in actual practice, the function or functions performed by that block may be performed in a single component or across multiple components, and/or may be performed using hardware, using software, or using a combination of hardware and software. Also, the devices 100 and 150 may include components other than those shown, including well-known components such as a processor and memory and perhaps audio and visual components.

Each of the devices 100 and 150 includes a transmit (TX) chain per antenna and a receive (RX) chain per antenna although, in the example of FIG. 1, only the transmit chains 115 of the device 100 and the receive chains 165 of the device 150 are represented. In the example of FIG. 1, an encoder and modulator block 105 and a transmit beamformer 110 are coupled upstream of the transmit chains, and an equalizer 170 and a decoder 175 are coupled downstream of the receive chains.

The encoder and modulator block 105 encodes and modulates a signal S. In one embodiment, a sub-channel division technique such as orthogonal frequency division modulation (OFDM) is utilized to partition the signal S into $N_{ss}$ spatial signals for F frequency bins (sub-carriers). From the sub-carrier point of view, the beamformer 110 weights and perhaps combines each spatial signal at each sub-carrier $S_{F,1}$, $S_{F,2}$, ..., $S_{F,Nss}$ to generate N different signals $S_1, S_2, ..., S_N$, one signal for each transmit chain. Thus, the beamformer 110 transforms each of the signal $S_{F,1}, S_{F,2}, ..., S_{F,Nss}$ to account for the specific characteristics of each channel associated with each of the antennas in the antenna array 120.

The transmit chains 115 can perform other operations on the steered and weighted signals. For example, the signals output from the beamformer 110 can be converted into digital outputs that are in turn converted into analog baseband outputs, which are then modulated into wireless (e.g., radio frequency, RF) signals that are up-converted from the baseband frequency and transmitted via the antenna array 120.

Signals transmitted from the antenna array 120 pass through each individual path $h_{M,N}$ to the antenna array 160. In FIG. 1, $h_{M,N}$ represents the characteristics of a path from the $N^{th}$ transmission antenna to the $M^{th}$ reception antenna. The paths are assumed to be flat fading channels (all frequency components of a signal experience the same magnitude of fading) for each frequency bin. Accordingly, the characteristics $h_{M,N}$ can be represented using complex numbers that quantify, for example, the change in amplitude and phase of a signal along the respective paths between the transmitter and receiver.

Note that, if the device 150 is transmitting, then the channel characteristics would be represented as $h_{N,M}$. Thus, the characteristics of the forward channel along a path from, for example, antenna 2 of the device 100 to antenna 1 of the device 150 would be identified as $h_{1,2}$, which also identifies the reverse channel along the same path from antenna 1 of the device 150 to antenna 2 of the device 100.

The transmitted signals are received at the receiving device 150 via the antenna array 160. The receive chains 165 can perform operations such as filtering, frequency down-conversion to the baseband frequency, and analog-to-digital conversion. The equalizer 170 detects the signals from the receive chains on a per frequency bin basis, and the decoder 175 decodes the output of the equalizer.

Figure 2:
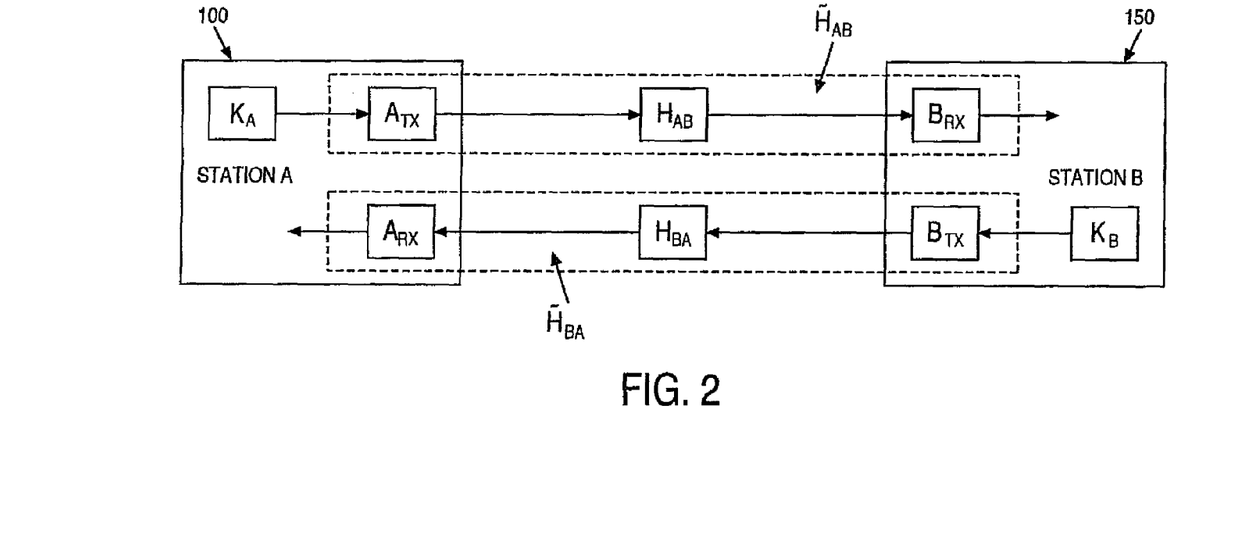
FIG. 2 is a block diagram illustrating baseband channels between wireless communication devices according to an embodiment of the invention.

FIG. 2 is a block diagram representing forward and reverse baseband-to-baseband channels between the devices 100 and 150 according to an embodiment of the invention. The device 100 is also referred to as station A, and the device 150 is also referred to as station B.

With station A conducting TxBF while transmitting to station B, the system model can be stated as:

$$y_B = \tilde{H}_{AB} Q_A x_A + n_B; \quad (1)$$

where $y_B$ and $n_B$ are the received signal vector and additive noise vector, respectively, at station B; $\tilde{H}_{AB}$ is the baseband-to-baseband equivalent channel from station A to station B; $x_A$ is the signal vector to be transmitted from station A; and $Q_A$ is the steering (or beamforming) matrix at station A that is designed based on the knowledge of $\tilde{H}_{AB}$. The steering matrix $Q_A$ is applied by the beamformer 110 (FIG. 1) to weight and combine each spatial signal $S_{F,1}, S_{F,2}, \ldots, S_{F,Nss}$ to generate N different signals $S_1, S_2, \ldots, S_N$, one signal for each transmit chain.

In TxBF with sounding, station A can predict the characteristics of the forward channel from station A to station B based on the assumption that the forward and reverse channels are reciprocal. This is a good assumption if the characteristics of those channels vary slowly compared to the interval between transmissions over those channels.

However, channel reciprocity applies to the physical propagation channels $H_{AB}$ and $H_{BA}$ ($H_{AB} = H_{BA}^T$) but not the actual channel. The actual channel observed at baseband contains the equivalent response of the transmit and receive chains, which may not be identical in the same device as discussed previously herein. Thus, a calibration process is employed to make $\tilde{H}_{AB} = \alpha \cdot \tilde{H}_{BA}^T$.

For simplicity of presentation, a 2×2 MIMO system (two antennas per station) is used in the following discussion; this discussion can be readily extended to an M×N system. With reference to FIG. 2:

$$\tilde{H}_{AB} = B_{RX} \cdot H_{AB} \cdot A_{TX} \quad (2)$$

$$= \begin{bmatrix} b_{RX}^1 & 0 \\ 0 & b_{RX}^2 \end{bmatrix} \cdot \begin{bmatrix} h_{11} & h_{12} \\ h_{21} & h_{22} \end{bmatrix} \cdot \begin{bmatrix} a_{TX}^1 & 0 \\ 0 & a_{TX}^2 \end{bmatrix} \quad (3)$$

$$= \begin{bmatrix} a_{TX}^1 b_{RX}^1 h_{11} & a_{TX}^2 b_{RX}^1 h_{12} \\ a_{TX}^1 b_{RX}^2 h_{21} & a_{TX}^2 b_{RX}^2 h_{22} \end{bmatrix};$$

where $B_{RX}$ and $A_{TX}$ represent the equivalent responses at the receive chains of station B and at the transmit chains of station A, respectively. By ignoring coupling (crosstalk) between the transmit and receive chains, they can be modeled as diagonal matrices $A_{TX}$ and $B_{RX}$ as in equation (3). In a similar manner:

$$\tilde{H}_{AB}^T = (A_{RX} \cdot H_{BA} \cdot B_{TX})^T \quad (4)$$

$$= \begin{bmatrix} a_{RX}^1 & 0 \\ 0 & a_{RX}^2 \end{bmatrix} \cdot \begin{bmatrix} h_{11} & h_{12} \\ h_{21} & h_{22} \end{bmatrix}^T \cdot \begin{bmatrix} b_{TX}^1 & 0 \\ 0 & b_{TX}^2 \end{bmatrix} \quad (5)$$

$$= \begin{bmatrix} b_{TX}^1 a_{RX}^1 h_{11} & b_{TX}^1 a_{RX}^2 h_{12} \\ b_{TX}^2 a_{RX}^1 h_{21} & b_{TX}^2 a_{RX}^2 h_{22} \end{bmatrix}.$$

Calibration is an over-the-air process that compensates for the imbalance between the transmit and receive chains at the baseband at one device or at both devices. The calibration process about to be described is performed for each applicable frequency bin (that is, for each sub-carrier being used).

Figure 3:
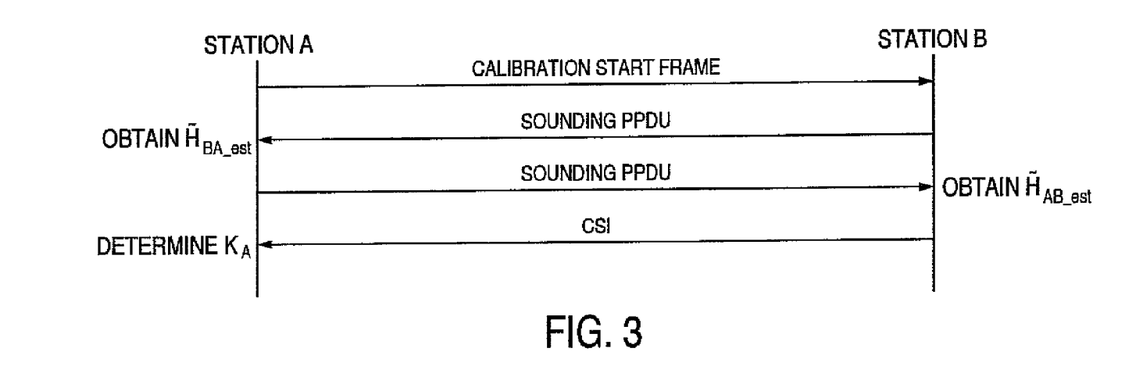
FIG. 3 illustrates signals exchanged during a calibration process according to an embodiment of the invention.

FIG. 3 illustrates an exchange of signals and information in one embodiment of a calibration process, where station A is the calibration initiator (beamformer) and station B is the calibration responder (beamformee). Per IEEE 802.11n, station A sends a calibration start frame to station B. In response, station B sends a calibration sounding response frame, referred to as a sounding PPDU (PLCP Protocol Data Unit, where PCLP refers to the Physical Layer Convergence Protocol). Station A can use the sounding PPDU from station B to estimate the characteristics of the channel ($\tilde{H}_{BA\_est}$) between the two stations. In response to the sounding PPDU from station B, station A sends a sounding PPDU to station B. Station B can use the sounding PPDU from station A to estimate the characteristics of the channel ($\tilde{H}_{AB\_est}$) between the two stations. Station B can then send channel state information (CSI) to station A. The CSI includes channel measurement information obtained when station B receives the sounding PPDU from station A. The correction matrix $K_A$, which represents the relative phase and gain mismatch between the transmit and receive chains of station A, can then be computed by station A (or by a peripheral device coupled to the station) using $\tilde{H}_{BA\_est}$ and the CSI based on $\tilde{H}_{AB\_est}$.

According to embodiments of the invention, either or both of the stations A and B can monitor the quality of the various signals being exchanged by the two devices. In particular, station A can monitor, for example, the RSSI (received signal strength indication), pilot EVM (error vector magnitude), or data EVM (if available) of the PPDU it receives from station B to determine whether the link between the devices is qualified enough for the calibration process. Similarly, station B can monitor the same quality metrics of the PPDU it receives from station A.

Either station can terminate the process if the link is judged unsatisfactory for calibration purposes. If station A decides not to use the link to station B for calibration, then it will not respond to the sounding PPDU from station B. If station B decides not to use link to station A for calibration, then it will not transfer the CSI based on $\tilde{H}_{AB\_est}$ to station A. Alternatively, either station can force a timeout to terminate the calibration process.

If the calibration process is terminated, then station A can initiate another calibration process at a later time. Station A may choose a different station for the next calibration. For example, station A may be an access point with access to multiple client stations that are capable of performing the calibration process. As such, station A can monitor the strengths of the links with each of the client stations and choose the station with the strongest link for the calibration process. In general, before sending the calibration start frame, the calibration initiator can monitor the strengths (or other quality metrics mentioned above) of signals between it and stations that are candidates for the calibration process, and maintain a priority list to select the most qualified station (e.g., the station with the strongest signal) to be the calibration responder.

In the event of a weak link between stations A and B, the calibration process does not necessarily have to be terminated. Instead, the stations can complete the process and also indicate in some manner that the calibration is of relatively low quality. Station A can use the calibration results that were determined based on the link with station B, and can also initiate another calibration, perhaps with a station other than station B, in order to get better results.

With reference back to FIG. 2, the correction matrix $K_A$ is:

$$K_A = A_{TX}^{-1} A_{RX} = \begin{bmatrix} a_{RX}^1/a_{TX}^1 & 0 \\ 0 & a_{RX}^2/a_{TX}^2 \end{bmatrix}. \quad (6)$$

To save memory, $K_A$ can be normalized by any of the diagonal entries in the correction matrix. In this example, the diagonal entry in the first row is chosen as the basis:

$$K_A = \begin{bmatrix} 1 & 0 \\ 0 & (a_{TX}^1 a_{RX}^2/a_{RX}^1 a_{TX}^2) \end{bmatrix}. \quad (7)$$

The value of $a_{TX}^1 a_{RX}^2/a_{RX}^1 a_{TX}^2$ can be obtained from the first row of $\tilde{H}_{AB}$ and the corresponding (e.g., first) row of $\tilde{H}_{BA}^T$ of equations (4) and (5), respectively (the terms $h_{M,N}$ cancel out):

$$\frac{\tilde{H}_{AB}(1,1)}{\tilde{H}_{BA}^T(1,1)} \cdot \frac{\tilde{H}_{BA}^T(1,2)}{\tilde{H}_{AB}(1,2)} = \frac{a_{TX}^1 b_{RX}^1}{b_{TX}^1 a_{RX}^1} \cdot \frac{b_{TX}^1 a_{RX}^2}{a_{TX}^2 b_{RX}^1} = \frac{a_{TX}^1 a_{RX}^2}{a_{RX}^1 a_{TX}^2}; \quad (8)$$

$$\Rightarrow K_A = \begin{bmatrix} 1 & 0 \\ 0 & \left(\frac{\tilde{H}_{AB}(1,1)}{\tilde{H}_{BA}^T(1,1)} \cdot \frac{\tilde{H}_{BA}^T(1,2)}{\tilde{H}_{AB}(1,2)}\right) \end{bmatrix}. \quad (9)$$

Alternatively, the correction matrix $K_A$ can be obtained from the second row of $\tilde{H}_{AB}$ and the corresponding (e.g., second) row of $\tilde{H}_{BA}^T$ of equations (4) and (5), respectively:

$$K_A = \begin{bmatrix} 1 & 0 \\ 0 & \left(\frac{\tilde{H}_{AB}(2,1)}{\tilde{H}_{BA}^T(2,1)} \cdot \frac{\tilde{H}_{BA}^T(2,2)}{\tilde{H}_{AB}(2,2)}\right) \end{bmatrix}. \quad (10)$$

In general, the correction matrix $K_A$ can be obtained from the $M^{th}$ row of $\tilde{H}_{AB}$ and the corresponding $M^{th}$ row of $\tilde{H}_{BA}$ of equations (4) and (5), respectively. In order to obtain a non-zero or finite result, the rows selected to calculate the correction matrix should contain only non-zero entries.

Generally speaking, $\tilde{H}_{BA}$ is a set (sometimes referred to herein as the first set) of channel characteristics for a selected frequency bin describing the MIMO channel from station B to station A, and $\tilde{H}_{AB}$ is a set (sometimes referred to herein as the second set) of channel characteristics for the selected frequency bin describing the MIMO channel from station A to station B. Accordingly, the $M^{th}$ row of $\tilde{H}_{BA}^T$ corresponds to a subset of the first set and includes channel characteristics for the selected frequency bin describing the channel gains from a selected antenna on station B (e.g., antenna M) to each of the N antennas on station A. Similarly, the $M^{th}$ row of $\tilde{H}_{AB}$ corresponds to a subset of the second set and includes channel characteristics for the selected frequency bin describing the channel gains from the same N antennas on station A to the selected antenna M on station B.

The correction matrix $K_B$ can then be computed in a manner similar to that just described with station B acting as calibration initiator and station A (or another station) acting as calibration responder, although in many TxBF implementations only the beamformer is calibrated.

Figure 4:
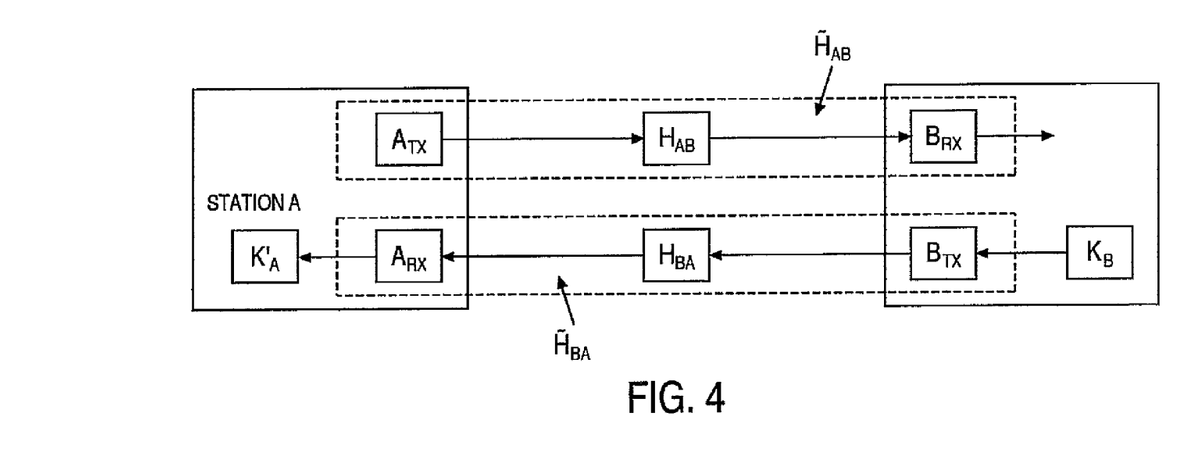
FIG. 4 is a block diagram illustrating baseband channels between wireless communication devices according to another embodiment of the invention.

FIG. 4 is a block diagram representing forward and reverse baseband-to-baseband channels between the devices 115 and 165 according to another embodiment of the invention. In this embodiment, the beamformer's receive chains are calibrated (instead of the beamformer's transmit chains, as in the example of FIG. 2) by applying a correction matrix $K'_A$ that is derived as $K_A^{-1}$, where $K_A$ is determined as described above.

With reference again to FIG. 2, after the correction matrix $K_A$ is determined, the steering matrix $Q_A$ can be determined using the local estimate of $\tilde{H}_{BA}$ (e.g., the right singular matrix of the singular value decomposition of $\tilde{H}_{BA}^T$), and then left-multiplying the correction matrix $K_A$ with the signal it is to transmit ($Q_A x_A$) at the baseband. If calibration is needed only to compensate for the phase difference between the transmit and receive chains (if the gain mismatch is insignificant and can be ignored), then only the phasor part of $K_A$ is retained (denoted as $\hat{K}_A$). The product $\hat{K}_A Q_A$ can be treated as an effective steering matrix. In one embodiment, the steering matrix is stored in a compressed format ($Q_A$ is represented using angle values), and consequently $\hat{K}_A Q_A$ can be readily implemented using adders.

On the other hand, if the gain mismatch cannot be ignored, then it can be compensated for to avoid a power normalization problem in the transmit chain. Accordingly, a steering matrix $Q'_A$ can be derived from the right singular matrix of $\tilde{H}_{BA}^T K_A^{-1}$. As a result, the correction matrix is effectively absorbed into $Q'_A$. The transmitted signal at the baseband is thus $Q'_A x_A$, which will maintain the transmit chain power. Note that:

$$\tilde{H}_{AB} K_A = \alpha H_{BA}^T \Rightarrow \tilde{H}_{AB} = \alpha H_{BA}^T K_A^{-1}. \quad (11)$$

As mentioned above, calibration can be performed for each of the frequency bins. Furthermore, as described above, the correction matrix $K_A$ for a frequency bin can be determined by mathematically operating on corresponding rows of the channel matrices $\tilde{H}_{AB}$ and $\tilde{H}_{BA}^T$ as shown in equations (8) and (9), for example, where the rows that are chosen for the correction matrix calculation do not contain any zero-valued entries (all entries in the row are non-zero). Alternatively, a threshold value (other than zero) can be defined, in which case the rows that are selected for the correction matrix computation only contain entries that all exceed the threshold value.

In one embodiment, the correction matrix for a particular frequency bin is determined by first calculating correction matrices using all eligible rows of $\tilde{H}_{AB}$ and $\tilde{H}_{BA}^T$, and then averaging the results. That is, a set of correction matrices are calculated for a particular frequency bin, using each eligible pair of rows from $\tilde{H}_{AB}$ and $\tilde{H}_{BA}^T$, where an eligible pair consists of a row of $\tilde{H}_{AB}$ and the corresponding row of $\tilde{H}_{BA}^T$ and where both rows in the pair do not contain any zero-valued entries. The correction matrix for the particular frequency bin is then determined by averaging the set of correction matrices for that bin. Such an approach would be expected to yield a more accurate correction matrix for that frequency bin.

There may be instances in which some zero-valued entries are included in the channel characteristics $\tilde{H}_{BA\_est}$ or the CSI of $\tilde{H}_{AB\_est}$ and hence in the matrices $\tilde{H}_{BA}$ and $\tilde{H}_{BA}^T$. For example, $\tilde{H}_{BA\_est}$ or the CSI of $\tilde{H}_{AB\_est}$ may exhibit zero-valued entries on severely faded frequency bins (referred to herein as null bins) due to finite bit representation. According to embodiments of the present invention, a correction matrix $K_A$ can be determined for the null bins using the correction matrices for other bins. More specifically, correction matrices can be determined for the frequency bins that are adjacent to, or are the nearest non-null neighbor to, a null bin. Those correction matrices can then be interpolated or extrapolated to calculate a correction matrix for the null bin. Interpolation and extrapolation are examples of curve-fitting techniques; generally speaking, any sort of curve-fitting technique can be utilized to calculate a correction matrix for a null bin based on correction matrices for other frequency bins.

For example, a correction matrix $K^1_A$ can be determined for a frequency bin f1 and a correction matrix $K^3_A$ can be determined for a frequency bin f3, where the bins f1 and f3 are adjacent to a frequency bin f2. The correction matrices $K^1_A$ and $K^3_A$ can be averaged to determine a correction matrix for the frequency bin f2.

This type of approach can also be used to conserve memory space. For example, instead of determining a correction matrix for each frequency bin, correction matrices are calculated only for sampled frequency bins and interpolated for non-sampled bins.

In one embodiment, a smoothing filter is applied to the correction matrices, in order to smooth those matrices over the range of frequency bins.

There may be situations in which it is not possible to calculate a correction matrix for a particular frequency bin or perhaps even for all of the frequency bins. In those situations, the calibration process can be re-initiated. In one embodiment, a bit can be set to trigger the start of the calibration process.

In one embodiment, unless triggered as just described, the calibration process is performed periodically (e.g., at prescribed time intervals). The interval between calibrations can depend on factors such as the rate at which the gain and/or phase mismatch between a device's transmit and receive chains varies over time. If the gain and/or phase vary slowly over time, then the calibration process can be performed less frequently. In one embodiment, if the gain and/or phase vary slowly over time, then the interval between calibrations is longer than the interval between steering matrix $Q_A$ updates.

Each calibration can utilize correction matrices obtained during previous calibrations. A weighting rule can be set and applied to previous correction matrices so that the most recent calibration is more sensitive to newer correction matrices.

Figure 5:
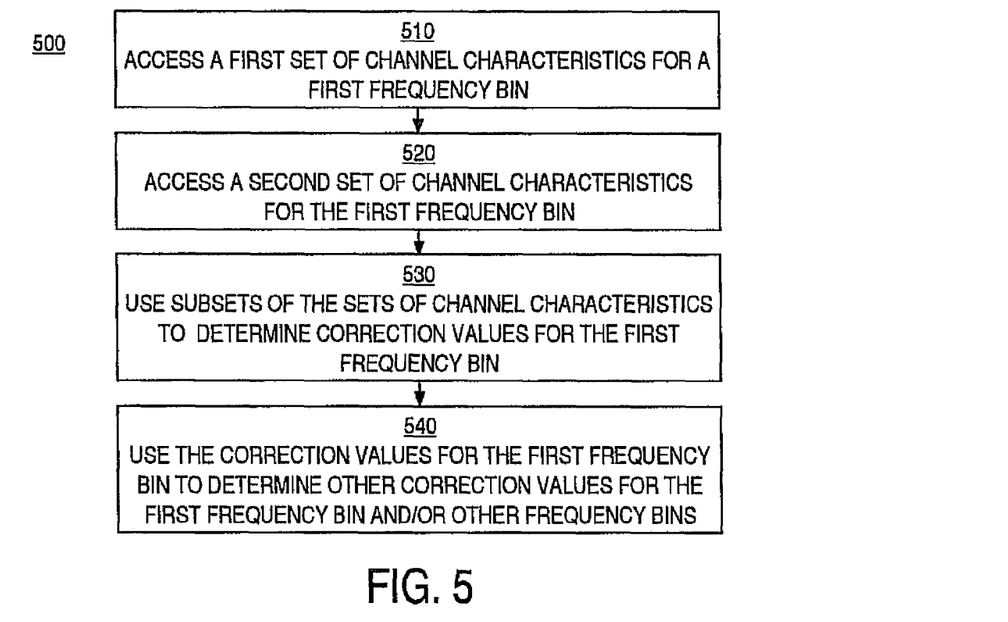
FIG. 5 is a flowchart of a method for calibrating a wireless communication device according to an embodiment of the invention.
Figure 6:
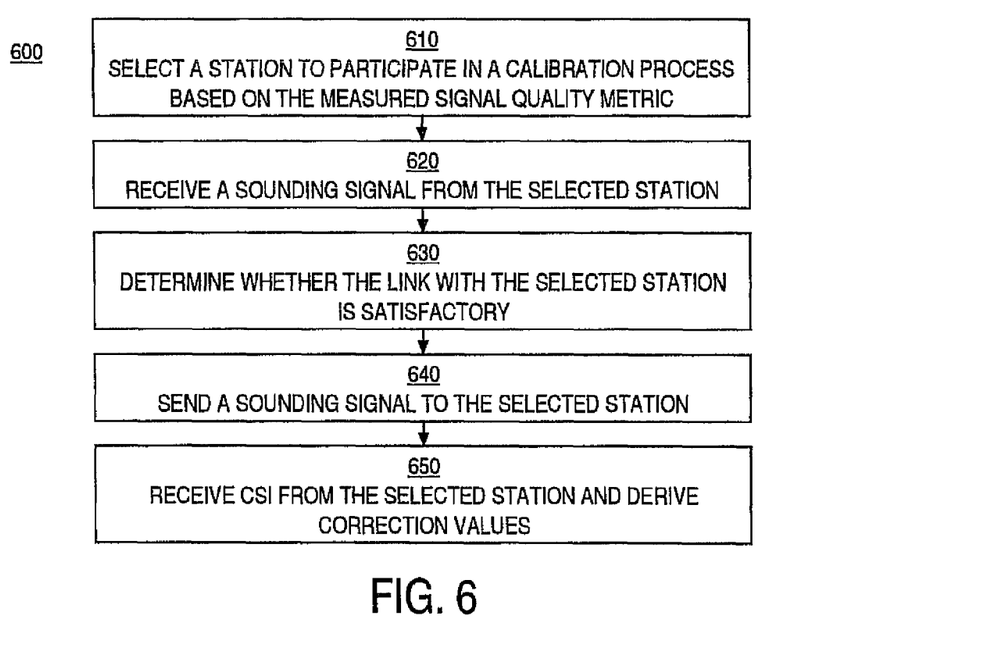
FIG. 6 is a flowchart of a method for calibrating a wireless communication device according to another embodiment of the invention.

FIGS. 5 and 6 are flowcharts 500 and 600, respectively, of embodiments of methods for calibrating a wireless communication device. Although specific steps are disclosed in the flowcharts 500 and 600, such steps are exemplary. That is, various other steps or variations of the steps recited in the flowcharts 500 and 600 can be performed. The steps in the flowcharts 500 and 600 may be performed in an order different than presented. Furthermore, the features of the various embodiments described by the flowcharts 500 and 600 can be used alone or in combination with each other. In one embodiment, the flowcharts 500 and 600 can be implemented as computer-executable instructions stored in a computer-readable medium.

As described previously herein, in one embodiment, the operating frequency of each transmitted signal is partitioned into a number of sub-carriers (frequency bins). In such an embodiment, the method of flowchart 500 may be performed for each frequency bin.

With reference first to FIG. 5, in block 510, a first station (e.g., station A of FIG. 2) can access a first set of channel characteristic values (e.g., a first channel matrix $\tilde{H}_{BA}^T$) for a particular frequency bin (a first frequency bin, which is not necessarily the lowest or highest frequency bin). The first set of channel characteristic values are based on a first sounding signal that the first station receives from a second station (e.g., station B of FIG. 2).

In block 520 of FIG. 5, the first station can also access a second set of channel characteristic values (e.g., a second channel matrix $\tilde{H}_{AB}$) for the first frequency bin. The second set of channel characteristic values are based on CSI that the first station receives from the second station in response to a second sounding signal that that was sent from the first station to the second station.

In block 530, subsets of the first and second sets can be selected and manipulated in order to determine a first set of correction values (e.g., a first correction matrix $K_{A,1}$) that can be applied to signals in the first frequency bin. More specifically, in one embodiment, a row of the first channel matrix $\tilde{H}_{BA}^T$, and the corresponding row of the second channel matrix $\tilde{H}_{AB}$, can be selected, and the entries in those rows can be selectively multiplied and divided as described by equations (8) and (9), for example, to calculate the first correction matrix $K_A$.

In block 540, the first set of correction values (e.g., $K_{A,1}$) can be used as the basis for determining other sets of correction values. In one embodiment, different subsets of the first and second sets of channel characteristic values can be selected to determine other sets of correction values for the first frequency bin. More specifically, in one embodiment, another row of the first channel matrix $\tilde{H}_{BA}^T$, and the corresponding row of the second channel matrix $\tilde{H}_{AB}$, can be selected, and the entries in those rows can be selectively multiplied and divided as described by equations (10), for example, to calculate a second correction matrix $K_{A,2}$ for the first frequency bin. If desired, additional correction matrices for the first frequency bin can be calculated using other eligible rows of the first and second channel matrices (that is, using pairs of corresponding rows that do not contain zero-valued entries, as described previously herein). The various correction matrices for the first frequency bin (e.g., $K_{A,1}$ and $K_{A,2}$) can then be averaged to determine a better result for the first frequency bin.

In another embodiment, the correction values for the first frequency bin (the correction matrix $K_A$ for the first frequency bin) can be used with correction values for one or more other frequency bins to derive correction values for yet other frequency bins. For example, the first station can access a set (which may be referred to herein as a third set) of channel characteristic values for a second frequency bin for the channel from the second station to the first station, and another set (which may be referred to herein as a fourth set) of channel characteristic values for the second frequency bin for the channel from the first station to the second station. The third set of channel characteristic values are based on a sounding signal that the first station receives from a second station, and the fourth set of channel characteristic values are based on CSI that the first station receives from the second station in response to a sounding signal that that was sent from the first station to the second station. Subsets of the third and fourth sets of channel characteristic values can be used to determine a second set of correction values that are applicable for the second frequency bin. The first set of correction values (from block 530) and the second set of correction values can then be used to determine a set of correction values that are applicable for a third frequency bin. For example, the set of correction values for the third frequency bin can be interpolated or extrapolated from the correction values for the first and second frequency bins.

As mentioned previously herein, the first station (e.g., station A) may have access to multiple client stations that are capable of performing the calibration process. In that previous example, station A selected one of the client stations to be the calibration responder. Alternatively, station A (the beamformer) can invite multiple qualified client stations (beamformees) to participate in the calibration process and can generate multiple correction matrices correspondingly.

Those correction matrices can be averaged; alternatively, the various correction matrices can be weighted depending on, for example, the individual RSSI or EVM of the respective beamformee and then averaged. Generally speaking, with reference to FIG. 5, blocks 510 and 520 can be repeated for each of a number of beamformees, and the results can be weighted and averaged to determine the first set of correction values (e.g., the first correction matrix $K_{A,1}$). As noted previously herein, a purpose of the correction matrix is to compensate for differences between the transmit and receive chains in the beamformer. By averaging multiple correction matrices as just described, a more accurate correction matrix can be obtained.

With reference now to FIG. 6, in block 610, in one embodiment, a first station (e.g., station A of FIG. 2) monitors the measured signal quality metric of signals received from a number of other devices and, based on signal strength, pilot EVM, or data EVM (if available), selects one of those devices as a candidate to participate in a calibration process. The first station can then send a calibration start frame to the selected device (e.g., station B of FIG. 2).

In block 620, the first station receives a first sounding signal from the second station and generates a first set of channel characteristic values (e.g., a first channel matrix $\tilde{H}_{BA}^{T}$) for at least a first frequency bin.

In block 630, a determination is made as to whether the link between the two stations is satisfactory. For example, the first station can measure the strength of the first sounding signal to determine if the signal is strong enough. If the signal is deemed satisfactory, then the calibration process continues to block 640. Otherwise, the calibration process may be terminated or the calibration process may be labeled as low quality.

In block 640, the first station sends a second sounding signal to the second station.

In block 650, the first station receives CSI from the second station in response to the second sounding signal, and generates at least a second set of channel characteristic values (e.g., a second channel matrix $\tilde{H}_{AB}$) for the first frequency bin. Subsets of the first and second sets of channel characteristic values can be used to derive correction matrices as previously described herein. In one embodiment, the second station sends the CSI to the first station only if the second sounding signal is deemed satisfactory (e.g., the signal is strong enough).

In summary, according to embodiments of the invention, the reliability of the calibration process is improved. In addition, better correction matrices can be calculated for each frequency bin, including correction matrices for faded bins, thereby improving the quality of the calibration results. Also, correction matrices can be determined more efficiently, and as a result, the loads on processing, power and memory resources can be reduced.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of calibrating a wireless communication station, said method comprising:

accessing a first set of channel characteristic values for a first frequency bin and corresponding to a multiple-input multiple-output (MIMO) channel from a second station to a first station;

accessing a second set of channel characteristic values for said first frequency bin and corresponding to a MIMO channel from said first station to said second station;

using a subset of said first set and a subset of said second set to determine a first set of correction values that are applicable for said first frequency bin, said correction values useful for compensating for differences between transmit and receive chains of said first station; and using said first station, using said first set of correction values to determine a derived set of correction values for calibration of said first station.

2. The method of claim 1 wherein said subsets of said first and second sets correspond to reverse and forward channels between a first antenna of said second station and a plurality of antennas of said first station.

3. The method of claim 2 further comprising:

selecting a row of a first matrix comprising said first set of channel characteristic values, said row of said first matrix comprising first entries that correspond to each channel response from said first antenna to said plurality of antennas;

selecting a row of a second matrix comprising said second set of channel characteristic values, said row of said second matrix comprising second entries that correspond to each channel response from said plurality of antennas to said first antenna; and using said first entries and said second entries to determine a first correction matrix comprising said first set of correction values.

4. The method of claim 3 wherein said first and second entries comprise nonzero values.

5. The method of claim 3 further comprising normalizing said first correction matrix by any diagonal entry of said first correction matrix.

6. The method of claim 3 further comprising determining a steering matrix that is applied by said first station to a signal to be transmitted,
wherein said steering matrix is determined by:
multiplying said first matrix and the inverse of said first correction matrix; and determining the right singular matrix of the result of said multiplying.

7. The method of claim 6 wherein said first correction matrix is determined less frequently than said steering matrix.

8. The method of claim 1 further comprising:

selecting a first plurality of subsets of said first set and a second plurality of subsets of said second set, wherein said first and second pluralities of subsets correspond to selected channel responses between antennas of said first station and antennas of said second station;

determining sets of correction values using said first and second pluralities of subsets; and averaging said sets of correction values to produce said derived set of correction values.

9. The method of claim 1 further comprising:

accessing a third set of channel characteristic values for a second frequency bin for said channel from said second station to said first station;

accessing a fourth set of channel characteristic values for said second frequency bin for said channel from said first station to said second station;

using a subset of said third set and a subset of said fourth set to determine a second set of correction values that are applicable for said second frequency bin; and using said first and second sets of correction values to determine said derived set of correction values, wherein said derived set of correction values are applicable for a third frequency bin.

10. The method of claim 1 further comprising:
receiving, at said first station, a first sounding signal from said second station and generating said first set of channel characteristic values therefrom;
sending a second sounding signal from said first station to said second station; and
receiving, at said first station, channel state information (CSI) from said second station and generating said second set of channel characteristic values therefrom, said CSI based on said second sounding signal.

11. The method of claim 10 further comprising monitoring the quality of said first sounding signal in order to determine whether said channel from said second station to said first station is satisfactory for said calibrating.

12. The method of claim 11 wherein said first station sends said second sounding signal to said second station only if said first sounding signal is deemed satisfactory.

13. The method of claim 10 further comprising monitoring the quality of said second sounding signal in order to determine whether said channel from said first station to said second station is satisfactory for said calibrating.

14. The method of claim 13 wherein said second station sends said CSI to said first station only if said second sounding signal is deemed satisfactory.

15. The method of claim 1 wherein said second station is selected from among a plurality of available stations, wherein said method further comprises:
comparing a measure of signal quality between said first station and each of said available stations; and
selecting said second station based on said measure of signal quality.

16. The method of claim 1 further comprising:
accessing a first plurality of channel characteristic values for said first frequency bin and corresponding to MIMO channels from a plurality of stations to said first station;
accessing a second plurality of channel characteristic values for said first frequency bin and corresponding to MIMO channels from said first station to said plurality of stations;
using subsets of said first and second pluralities of channel characteristic values, including said subsets of said first and second sets of channel characteristic values, to determine a plurality of sets of correction values; and
averaging said plurality of sets of correction values to determine said first set of correction values.

17. The method of claim 16 further comprising, prior to said averaging, weighting each of said sets of correction values according to a respective measure of signal quality between said first station and each of said plurality of stations.

18. The method of claim 1 wherein a plurality of derived sets of channel correction values are recorded over time.

19. The method of claim 18 further comprising applying a weighting rule to said plurality of derived sets of channel correction values so that most recent instances of said derived sets of channel correction values are weighted more than preceding instances of said derived sets of channel correction values.

20. A wireless communication first device comprising:
a plurality of antennas operable for transmitting and receiving signals, wherein said signals are partitioned into frequency bins;
a plurality of transmit chains coupled to said antennas and comprising a beamformer; and
a plurality of receive chains coupled to said antennas; wherein differences between said transmit chains and said receive chains are compensated for by applying frequency bin-dependent correction values to signals to be transmitted, wherein a first set of correction values for a first frequency bin is derived from i) a subset of a first set of channel characteristic values for said first frequency bin, said first set corresponding to a multiple-input multiple-output (MIMO) channel from said second device to a first device, and ii) a subset of a second set of channel characteristic values for said first frequency bin, said second set corresponding to a MIMO channel from said first device to said second device; wherein other correction values are derived using said first set of correction values.

21. The device of claim 20 wherein a first correction matrix comprises said first set of correction values containing entries that is derived from a row of a first matrix and a row of a second matrix, said first matrix comprising said first set of channel characteristic values and said second matrix comprising said second set of channel characteristic values, said row of said first matrix consisting of non-zero entries that correspond to each channel response from a first antenna of said second device to a plurality of antennas of said first device, said row of said second matrix consisting of non-zero entries that correspond to each channel response from said plurality of antennas to said first antenna.

22. The device of claim 21 wherein said beamformer applies a steering matrix to a signal to be transmitted, wherein said steering matrix represents the right singular matrix of a matrix that is the product of said first matrix and the inverse of said first correction matrix.

23. The device of claim 22 wherein said first correction matrix is updated less frequently than said steering matrix.

24. The device of claim 22 wherein different sets of correction values for said first frequency bin, including said first set of correction values, are averaged to determine correction values for said first frequency bin.

25. The device of claim 22 wherein correction values for a third frequency bin are derived using said first set of correction values, a second set of correction values for a second frequency bin, and an operation selected from the group consisting of: averaging, interpolation, extrapolation, and curve-fitting.

26. The device of claim 20 wherein said first device receives a first sounding signal from said second device and generates said first set of channel characteristic values therefrom; wherein further said first device sends a second sounding signal to said second device and receives channel state information (CSI) that is based on said second sounding signal from said second device, said CSI useful for generating said second set of channel characteristic values.

27. The device of claim 26 wherein said first device monitors a measure of the quality of said first sounding signal in order to determine whether said channel from said
second device to said first device is satisfactory for said calibrating, wherein said first device sends said second sounding signal to said second device only if said first sounding signal is deemed satisfactory.

28. The device of claim 20 wherein said first device selects said second device from among a plurality of available devices based on a comparison of measures of signal quality between said first device and each of said available devices.

29. A computer-implemented method of calibrating a multiple-input multiple-output (MIMO) first device, said method comprising:

measuring the quality of signals sent from a plurality of devices to select a second device that is candidate to participate in said calibrating;

receiving a first sounding signal from said second device and generating therefrom a first set of channel characteristic values for a first frequency bin;

receiving channel state information (CSI) from said second device in response to a second sounding signal sent from said first device to said second device and generating therefrom a second set of channel characteristic values for said first frequency bin; and using a subset of said first set and a subset of said second set to determine a first set of correction values that are applicable for said first frequency bin, said correction values useful for compensating for differences between transmit and receive chains of said first device, wherein said first set of correction values are useful for deriving correction values for other frequency bins and for deriving other correction values for said first frequency bin.

30. The method of claim 29 wherein said subsets of said first and second sets correspond to channel response between a first antenna of said second device and a plurality of antennas of said first device.

31. The method of claim 29 further comprising:

selecting a row of a first matrix comprising said first set of channel characteristic values, said row of said first matrix comprising non-zero first entries that correspond to each channel response from a first antenna of said second device to antennas of said first device;

selecting a row of a second matrix comprising said second set of channel characteristic values, said row of said second matrix comprising non-zero second entries that correspond to each channel response from said antennas of said first device to said first antenna of said second device; and using said first entries and said second entries to determine a first correction matrix comprising said first set of correction values.

32. The method of claim 31 further comprising determining a steering matrix that is applied by said first device to a signal to be transmitted, wherein said steering matrix is determined by:

multiplying said first matrix and the inverse of said first correction matrix; and determining the right singular matrix of the result of said multiplying.

33. The method of claim 29 further comprising averaging different sets of correction values for said first frequency bin, including said first set of correction values, to determine said other correction values for said first frequency bin.

34. The method of claim 29 further comprising:

deriving a second set of correction values for a second frequency bin; and deriving a third set of correction values for a third frequency bin using said first and second sets of correction values.

35. The method of claim 29 wherein said first device sends said second sounding signal to said second device only if said first sounding signal is deemed satisfactory.

36. The method of claim 29 wherein said second device sends said CSI to said first device only if said second sounding signal is deemed satisfactory.

* * * * *